F. CHRISTY.
Branding-Stamp.
No. 224,877.    Patented Feb. 24, 1880.
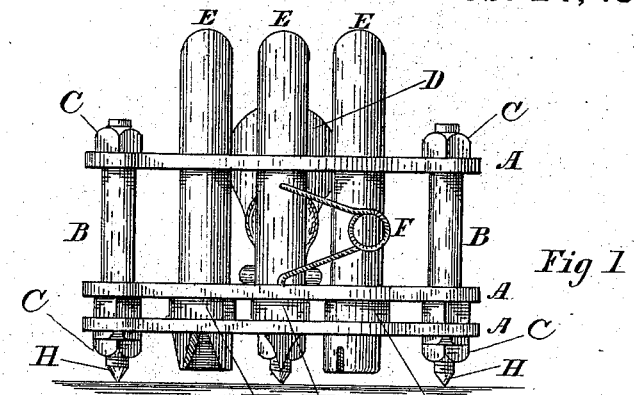
Fig 1.
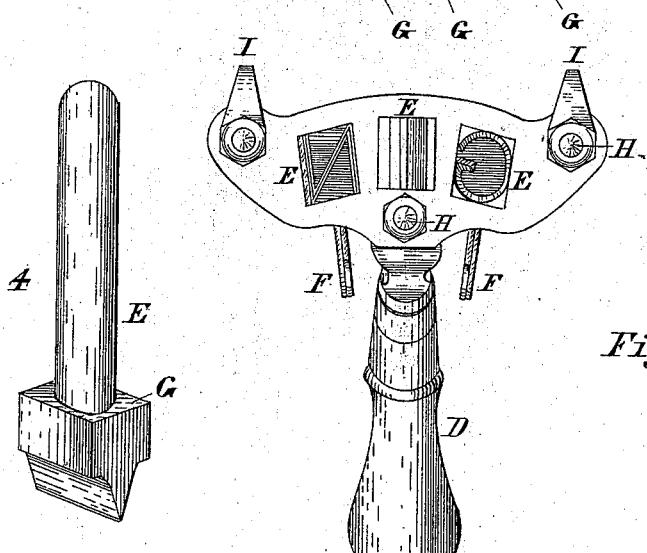
Fig 4.
Fig 2.
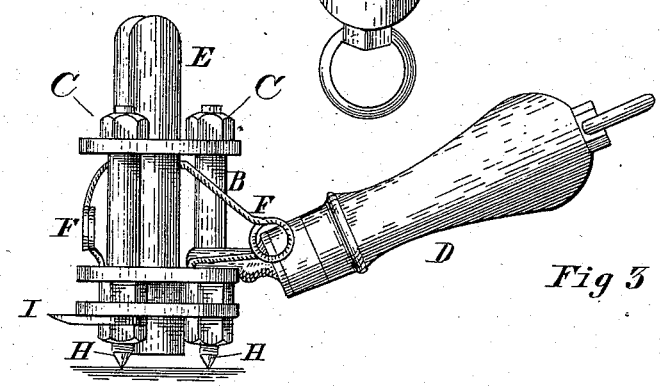
Fig 3.
Witnesses:
Inventor:
Fritz Christy.
By Coburn & Thacher,
Attorneys.

F. CHRISTY.
Branding-Stamp.

No. 224,877. Patented Feb. 24, 1880.

Witnesses:
W. C. Corliss
J. W. Mallington

Inventor:
Fritz Christy
By Coburn & Thacher
Attorneys

UNITED STATES PATENT OFFICE.

FRITZ CHRISTY, OF CHICAGO, ILLINOIS, ASSIGNOR TO CHRISTIAN H. HANSON, OF SAME PLACE.

BRANDING-STAMP.

SPECIFICATION forming part of Letters Patent No. 224,877, dated February 24, 1880.

Application filed November 4, 1879.

*To all whom it may concern:*

Be it known that I, FRITZ CHRISTY, of Chicago, in the county of Cook and State of Illinois, have invented a Cutting-Stamp for Branding, which is fully described in the following specification, reference being had to the accompanying drawings, in which—

Figure 5:
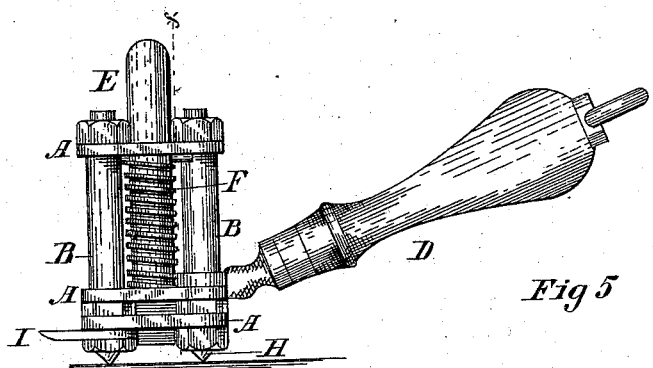
Figure 6:
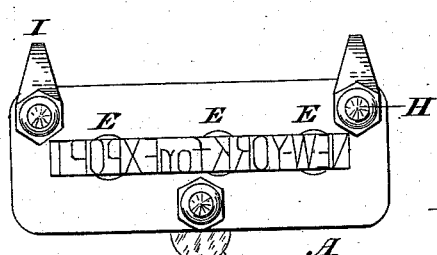
Figure 7:
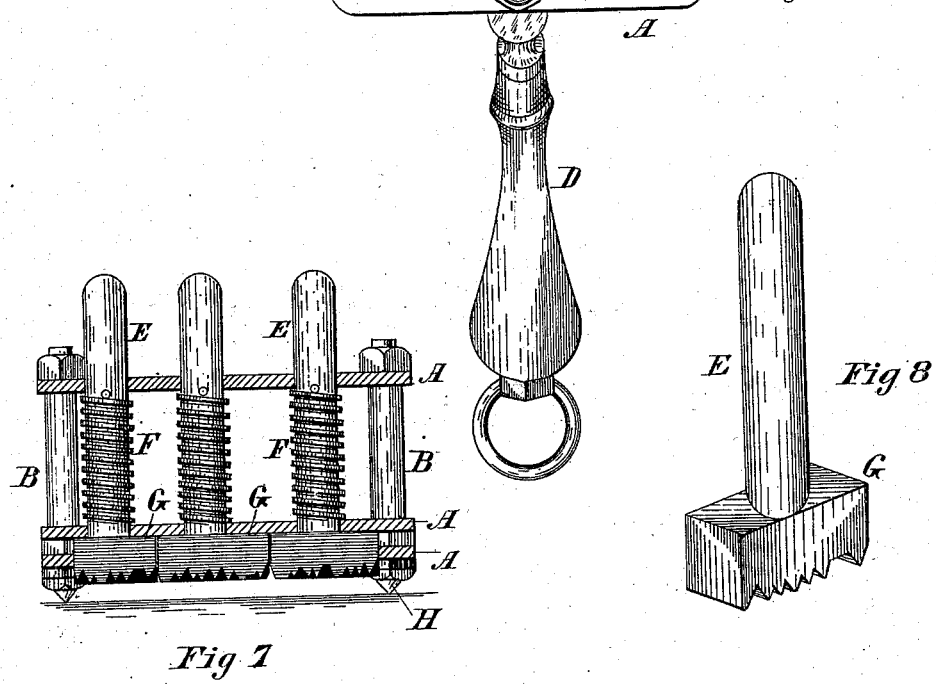
Figure 8:
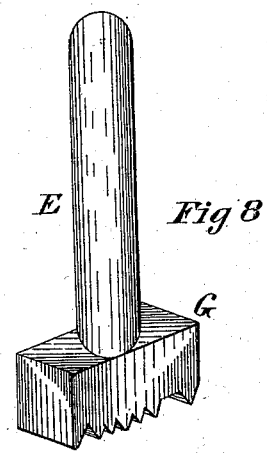

Figure 1 represents a side elevation of my stamping apparatus; Fig. 2, a bottom view of the same; Fig. 3, an end elevation thereof; Fig. 4, a perspective view of one of the dies detached from the frame; Fig. 5, a side elevation, showing a different form of the spring; Fig. 6, a bottom view, showing several letters or figures upon each stamp; Fig. 7, a transverse sectional view taken at the line $xx$, Fig. 5; Fig. 8, a detached view of the modified stamp or die.

The object of my invention is to brand barrels and other wooden vessels or boxes by stamping letters or other marks thereon, instead of burning them in, as heretofore done.

My invention consists in a suitable frame provided with stamps or dies, as hereinafter specified, with suitable attachments for their application.

I make a suitable frame composed of two or more large plates, A, held in proper position by posts B and nuts C. This frame is provided with a suitable handle, D. There are stamps E, the stems of which pass through the plates A. These stamps carry letters, figures, or such signs as may be desired to stamp upon the vessel, and these letters are cut or formed in such manner as to present a suitable edge for making an imprint into the wood. They are held in proper position by means of springs F and the shoulders G, striking against one of the plates, preventing the spring from throwing the stamps out of the frame. The opening in the bottom plate of the frame is adapted to the shape of the enlarged head of the die.

There are bearing-points H, which rest upon the vessel to be stamped, and they are so arranged as to adapt the frame to the vessel to be stamped. There are also points I projecting forward from the frame, adapted to penetrate the chine of a barrel or keg and hold the frame firmly in position while the vessel is being stamped.

There may be one letter upon each stamp, as shown in Fig. 1, or several letters, as shown in Figs. 6, 7, and 8.

The operation of the apparatus is as follows: The operator holds the apparatus by the handle D upon the barrel or other vessel to be stamped, resting upon bearing-points H. He then gives each stamp a sharp heavy blow, which forces it down upon the barrel and stamps the letters or figures on the stamp into the wood, and by striking each of the stamps in that way the vessel is properly stamped.

If it is desired to stamp with different letters or figures, different stamps can be inserted in the frame, cutting with the letters or figures desired.

The special object of my invention is to provide a suitable stamp for stamping barrels; but it may be readily seen that it can be used for stamping any vessel or box that will receive the impression, as above described.

Having thus described my invention, what I claim as new, and desire to secure by Letters Patent, is—

1. The combination of the supporting-frame provided with bearing-points H and independent indenting-stamps, substantially as and for the purpose specified.

2. The projecting points I, in combination with frame and stamps, for the purpose of more securely holding the apparatus in position, substantially as specified.

3. The combination of the supporting-frame A, provided with bearing-points H, a series of indenting-stamps acting independently of each other, and provided with shoulders, and also with letters, figures, or other characters with sharp outline, suitable for indenting the character, and springs arranged to raise the stamps independently, substantially as described.

FRITZ CHRISTY.

Witnesses:
 JNO. C. MACGREGOR,
 W. C. CORLIES.